United States Patent
Otto et al.

(10) Patent No.: US 7,018,003 B2
(45) Date of Patent: Mar. 28, 2006

(54) HYDRAULIC UNIT FOR SLIP-CONTROLLED BRAKE SYSTEMS

(75) Inventors: Albrecht Otto, Schöneck (DE); Dieter Dinkel, Schwalbach (DE)

(73) Assignee: Continental Teves AG & Co. oHG, Frankfurt (DE)

(*) Notice: Subject to any disclaimer, the term of this patent is extended or adjusted under 35 U.S.C. 154(b) by 0 days.

(21) Appl. No.: 10/502,491

(22) PCT Filed: Jan. 9, 2003

(86) PCT No.: PCT/EP03/00135

§ 371 (c)(1),
(2), (4) Date: Jul. 16, 2004

(87) PCT Pub. No.: WO03/064229

PCT Pub. Date: Aug. 7, 2003

(65) Prior Publication Data

US 2005/0082910 A1    Apr. 21, 2005

(30) Foreign Application Priority Data

Jan. 30, 2002  (DE) ............................... 102 03 485
Mar. 4, 2002   (DE) ............................... 102 09 559
Jun. 26, 2002  (DE) ............................... 102 28 424

(51) Int. Cl.
*B60T 8/36*    (2006.01)

(52) U.S. Cl. ............................ 303/119.3; 303/DIG. 10

(58) Field of Classification Search ............ 303/10–12, 303/87, 113.1, 116.1–116.4, 119.1–119.3, 303/DIG. 10; 137/884
See application file for complete search history.

(56) References Cited

U.S. PATENT DOCUMENTS

| 3,538,947 | A  | * | 11/1970 | Heinz et al. ................. 137/550 |
| 5,496,099 | A  | * | 3/1996  | Resch ...................... 303/114.1 |
| 5,975,652 | A  | * | 11/1999 | Otto ........................ 303/113.1 |
| 6,398,315 | B1 | * | 6/2002  | Dinkel et al. ............ 303/113.1 |
| 6,688,707 | B1 | * | 2/2004  | Dinkel et al. ............ 303/119.3 |
| 6,877,822 | B1 | * | 4/2005  | Dinkel et al. ............ 303/119.3 |

FOREIGN PATENT DOCUMENTS

| DE | 42 34 013 A1    | 4/1994  |
| DE | 197 12 211 A1   | 10/1998 |
| DE | 197 22 550 A1   | 12/1998 |
| DE | 197 44 522 A1   | 4/1999  |
| DE | 198 49 287 A1   | 1/2000  |
| WO | WO 98/42552     | 10/1998 |
| WO | WO-9925594 A1 * | 5/1999  |
| WO | WO-0100471 A1 * | 1/2001  |

* cited by examiner

*Primary Examiner*—Melody M. Burch
(74) *Attorney, Agent, or Firm*—RatnerPrestia (57) ABSTRACT

The present invention relates to a hydraulic unit for slip-controlled brake systems which includes a third row of valves in the accommodating member between a first row of valves having the valve-accommodating bores for the inlet valves and the second housing surface wherein the third row of valves includes at least in one valve-accommodating bore an electric change-over valve which is closed in its basic position and hydraulically linked to the pump-accommodating bore by way of a portion of a suction channel that traverses the first row of valves for connection to the pump-accommodating bore.

13 Claims, 5 Drawing Sheets

HYDRAULIC UNIT FOR SLIP-CONTROLLED BRAKE SYSTEMS

TECHNICAL FIELD

The present invention relates to a hydraulic unit for slip-controlled brake systems.

BACKGROUND OF THE INVENTION

DE 42 34 013 A1 discloses a hydraulic unit for a slip-controlled brake system, including a block-shaped accommodating member which, side by side in a first and second row of valves, comprises a total of eight valve-accommodating bore accommodating electromagnetically operable inlet and outlet valves. Disposed between the two rows of valves is a pump-accommodating bore, and two parallel accumulator-accommodating bores are arranged outside the rows of valves. The accumulator-accommodating bores are arranged transversely to the valve-accommodating bores directly adjacent to the second row of valves containing the outlet valve, while the pump-accommodating bore extends in parallel to the two rows of valves. Arranged centrally between the two rows of valves is a motor-accommodating bore that extends into the pump-accommodating bore paraxially relative to the valve-accommodating bores.

The disclosed hydraulic unit is appropriate exclusively for a slip-free braking operation and for being used for brake slip control.

Therefore, an object of the invention is to improve upon a hydraulic unit of the indicated type by simple means in such a fashion that an extension to traction slip control and driving dynamics control is possible, while the described arrangement of the bores in the accommodating member accommodating valves, pump and accumulator is maintained.

According to the invention, a third row of valves is provided opening into the first housing surface of the accommodating member between the housing plane provided for the ports of the braking pressure generator and the housing plane provided for the first row of valves. The third row of valves, which is thus arranged directly adjacent to the first row of valves, ensures a simple functional extension of the hydraulic unit designed for anti-lock control for the purpose of achieving traction slip control or driving dynamics control, to what end normally closed solenoid valves configured as electric change-over valves are inserted in the two outside valve-accommodating bores of the third row of valves. Separating valves in the form of solenoid valves open in their basic position are inserted into the two interposed valve-accommodating bores of the third row of valves.

DETAILED DESCRIPTION OF THE PREFERRED EMBODIMENTS

Figure 1:
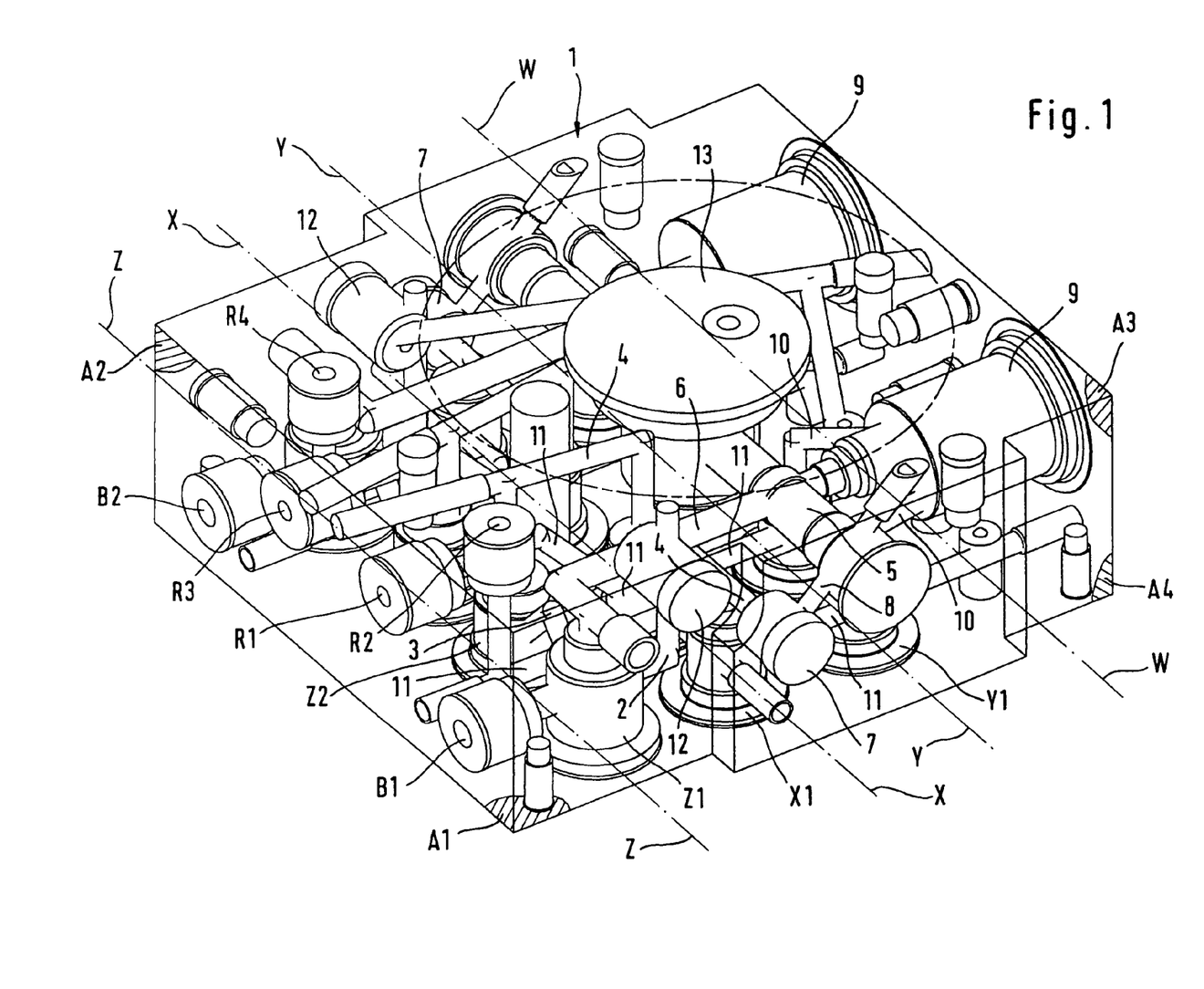
FIG. 1 is a three-dimensional illustration of a total view of the subject matter of the invention for depicting all accommodating bores and pressure fluid channels in the accommodating member.

FIG. 1 shows a perspective view of a hydraulic unit for slip-controlled brake systems, including an accommodating member 1 accommodating inlet valves and outlet valves in respectively four valve-accommodating bores X1–X4, Y1–Y4 of a first and second row of valves X, Y that open as blind-end bores into a first housing surface A1 of the accommodating member. Housing surface A1 is positioned at right angles relative to a second housing surface A2 into which several braking pressure generator and wheel brake ports B1, B2, R1, R3 open. Further, the block-shaped accommodating member 1 is penetrated by a pump-accommodating bore 5 that is directed transversely to the direction the valve-accommodating bores X1–X4, Y1–Y4 open into the accommodating member 1. The pump-accommodating bore 5 is arranged between the axes of the valve-accommodating bores X1–X4, Y1–Y4 of the first and second row of valves X, Y aligned vertically relative to the first housing surface A1. Pointing to the pump-accommodating bore 5 in a vertical distance from the first housing surface A1 is a motor-accommodating bore 13 which is not only used to secure an electric motor that actuates the pump pistons in the pump-accommodating bore 5 but also comprises a crank drive or eccentric drive.

Two parallel arranged accumulator-accommodating bores 9, which are aligned transversely to the axes of the valve-accommodating bores Y1–Y4 of the second row of valves Y, open into the accommodating member 1 in a third housing surface A3 which is disposed parallel opposite the second housing surface A2. Spring-applied pistons are inserted into the accumulator-accommodating bores 9. The depth of the accumulator-accommodating bores 9 has a smaller size than the horizontal distance of the second row of valves Y from the third housing surface A3 so that the connection between the third row of valves Y and the accumulator-accommodating bores 9 is established by way of several return channels 10.

Electromagnetically operable, normally closed outlet valves are arranged in the valve-accommodating bores Y1–Y4 of the second row of valves Y. The vertical axes of the valve-accommodating bores Y1–Y4 of the second row of valves Y extend between the two accumulator-accommodating bores 9 and the pump-accommodating bore 5 into the accommodating member 1.

To provide a hydraulic connection between a braking pressure generator port B1 and/or B2 and the wheel brake ports R1, R2 of the first brake circuit or to the wheel brake ports R3, R4, there is need for several channels that connect the valve-, pump- and accumulator-accommodating bores, that are generally made by appropriate drilling operations within the accommodating member 1 exactly as the valve-, accumulator- and pump-accommodating bores.

In order to design the original machining of the accommodating member 1 with least possible modifications and hence in a simple fashion, while bearing in mind the object of the invention, it is suggested that a third row of valves Z be arranged in the accommodating member 1 best between the first row of valves X that includes the valve-accommodating bores X1–X4 for the inlet valves and the second housing surface A2, said third row of valves Z accommodating an electric change-over valve closed in its basic position in a valve-accommodating bore Z1 or Z4 for each brake circuit. The hydraulic connection between the valve-accommodating bore Z1 or Z4 and the pump-accommodating bore 5 is established by way of a portion of a suction channel 6 traversing the first row of valves X for connection to the pump-accommodating bore 5.

Further, at least one valve-accommodating bore Z2 or Z3 is additionally arranged in the third row of valves Z for each brake circuit, housing an electromagnetically operable separating valve normally open in its basic position, with said further valve-accommodating bore Z2 or Z3 being connected to the valve-accommodating bore Z1 or Z4 housing the change-over valve by way of a short channel 3 which is preferably configured as a transverse channel.

Still further, the valve-accommodating bore Z2 or Z3 including the separating valve is respectively connected to an inlet channel 4 that leads to the first row of valves X and opens in said first row of valves X in each case into the bottom of a valve-accommodating bore X2 configured as a blind-end bore and receiving an electromagnetically operable inlet valve, that is normally open in its basic position. The inlet channel 4 of each one brake circuit propagates along the first row of valves X in the direction of a noise damping chamber 7 which opens as a short blind-end bore directly paraxially beside the pump-accommodating bore 5 into a fourth housing surface A4. On the other hand, the pump-accommodating bore 5 extends through the fourth housing surface until the opposite housing surface of the accommodating member 1. At the outside ends of the pump-accommodating bore 5, each one pressure channel 8 traverses the pump-accommodating bore 5 in the direction of the noise damping chambers 7, for what purpose the pressure channel 8 is preferably designed as a transverse channel that opens radially into the blind-end bore provided for the noise damping chambers 7.

Figure 2:
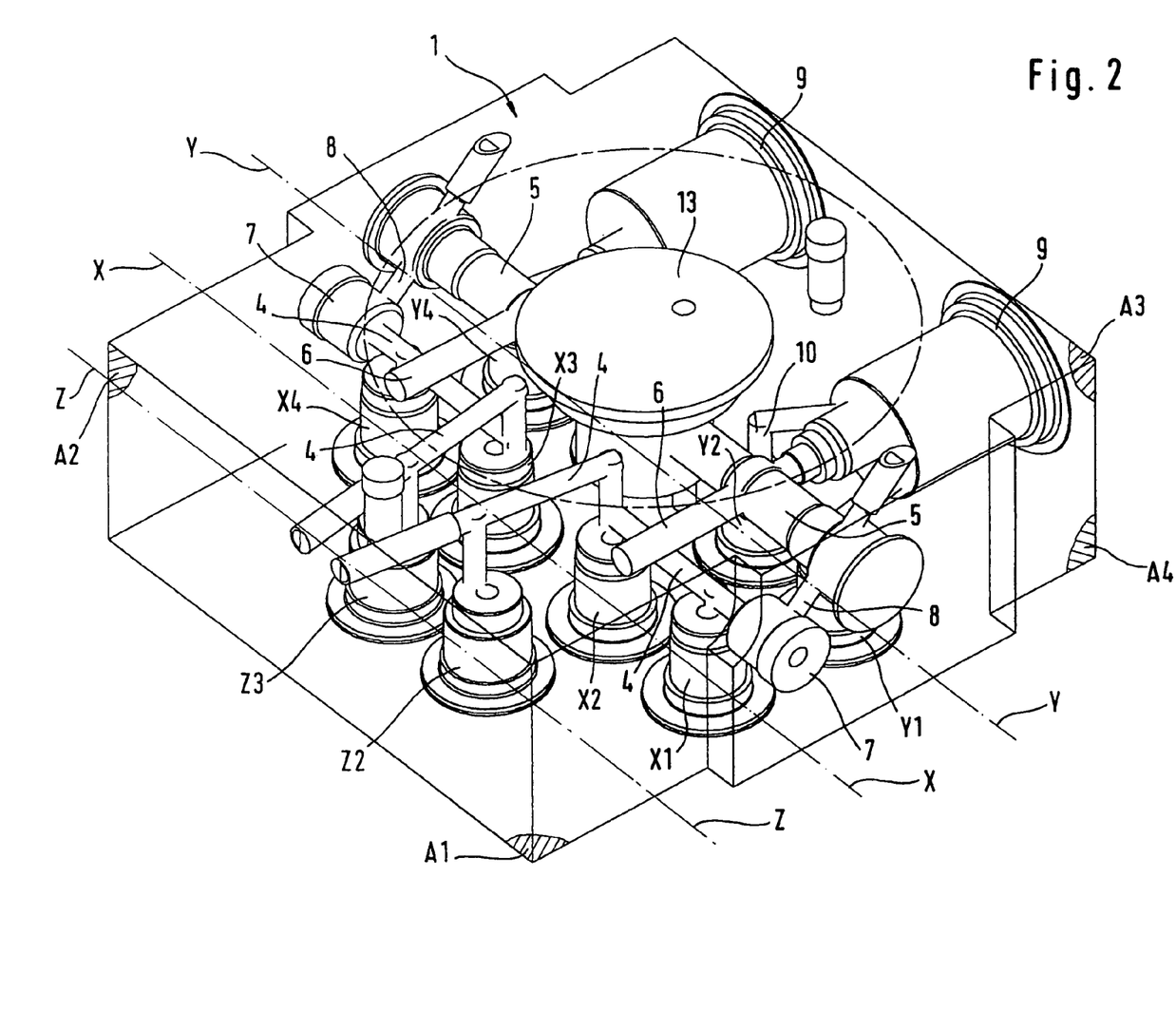
FIG. 2 is a detail view of FIG. 1 for depicting the channel connections between the valve-accommodating bores arranged in the third and first row of valves and the pump-accommodating bore, as well as the connection of the accumulator-accommodating bore to the pump and valve-accommodating bores of the second row of valves.

With respect to the details explained so far by way of FIG. 1, reference is also made to the description in FIG. 2, in as far as the described details do not become apparent from FIG. 1.

The bore portion of the pump which is in each case remote from the outside ends of the pump-accommodating bore 5 and disposed close to the motor-accommodating bore 13 is penetrated towards each accumulator-accommodating bore 9 by the suction channel 6 which opens into the bottom of the accumulator-accommodating bore 9. Moreover, a non-return valve opening in the direction of the pump-accommodating bore 5 is arranged in the short portion of the suction channel 6 positioned between the pump-accommodating bore 5 and the accumulator-accommodating bore 9 so that pressure fluid inflowing from the braking pressure generator port B1 or B2 through the electric change-over valve into the first portion of the suction channel 6 propagates in each brake circuit exclusively to the suction side of the pump arranged in the pump-accommodating bore 5.

Apart from the short portion of the suction channel 6, at least one return channel 10 opens into the bottom of the accumulator-accommodating bore 9, said channel being connected to the valve-accommodating bores Y1, Y2 or Y3, Y4, respectively, receiving the outlet valves and being arranged in the accommodating member 1 somewhat deeper in relation to the accumulator-accommodating bore 9. Thus, the second row of valves Y is directly adjacent to the accumulator-accommodating bore 9 so that shortest possible return channels 10 and short suction channels 9 lead to the accumulator-accommodating bores 9, what improves the evacuation, filling and efficiency of the pump.

In the present example, each valve-accommodating bore Y1, Y2 or Y3, Y4 of the second row of valves Y is designed as shortest possible blind-end bore. Each bottom of the valve-accommodating bores Y1–Y2 is respectively connected to a portion of a return channel 10 that leads to the accumulator-accommodating bore 9. Each return channel 10 is arranged as an angular channel laterally of the short portion of the suction channel 6. Downstream of the return channels 10 that open into the bottoms of the valve-accommodating bores Y1–Y4, the valve-accommodating bores Y1–Y4 are penetrated by the wheel pressure channels 11 which are continued radially or tangentially by the valve-accommodating bores Y1, Y2 or Y3, Y4, respectively, arranged in the second row of valves (Y) to the valve-accommodating bores X1, X2 or X3, X4, respectively, arranged in the first row of valves X. The wheel pressure channels 11 lead past the third row of valves Z to the wheel brake ports R1, R2 or R3, R4, respectively.

Besides, each one further portion of the wheel pressure channels 11 is continued radially or tangentially by the valve-accommodating bores Y1, Y2 or Y3, Y4, respectively, arranged in the second row of valves Y downstream of the accumulator-accommodating bores 9 to the third housing surface A3, where one pressure sensor accommodating bore W1–W4 is connected in each case at the end portion of each one wheel pressure channel 11 for detecting the brake pressures prevailing at the four wheel brake ports R1–R4.

Figure 3:
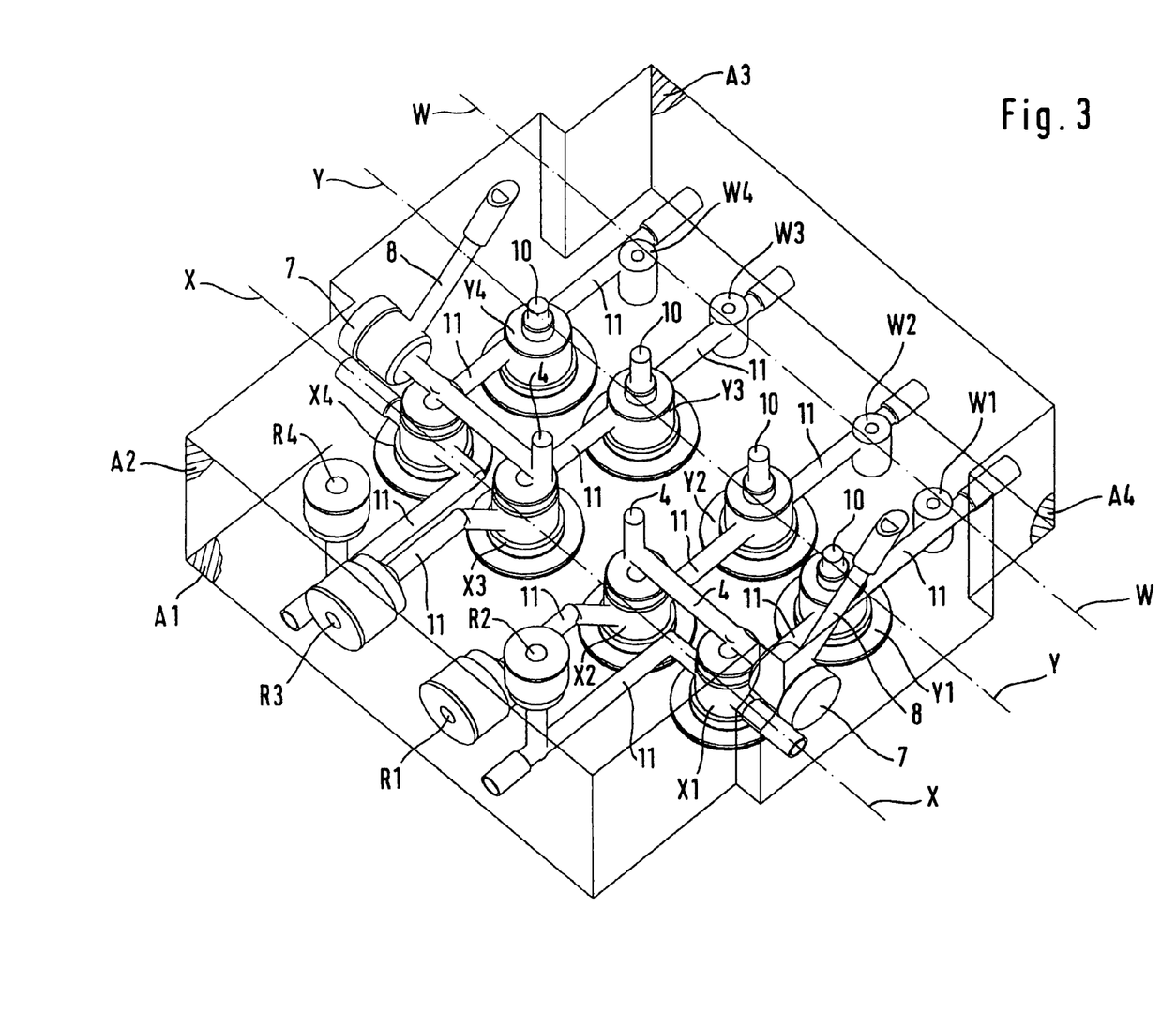
FIG. 3 is another detail view of FIG. 1 for explaining the channels of the first and second row of valves that lead to the wheel and pressure sensor ports.

FIG. 3 shows in this respect an especially clear illustration of all wheel pressure channels 11 and pressure sensor accommodating bores W1, W2, W3, W4 arranged in the horizontal plane of the first and second row of valves X, Y.

Figure 5:
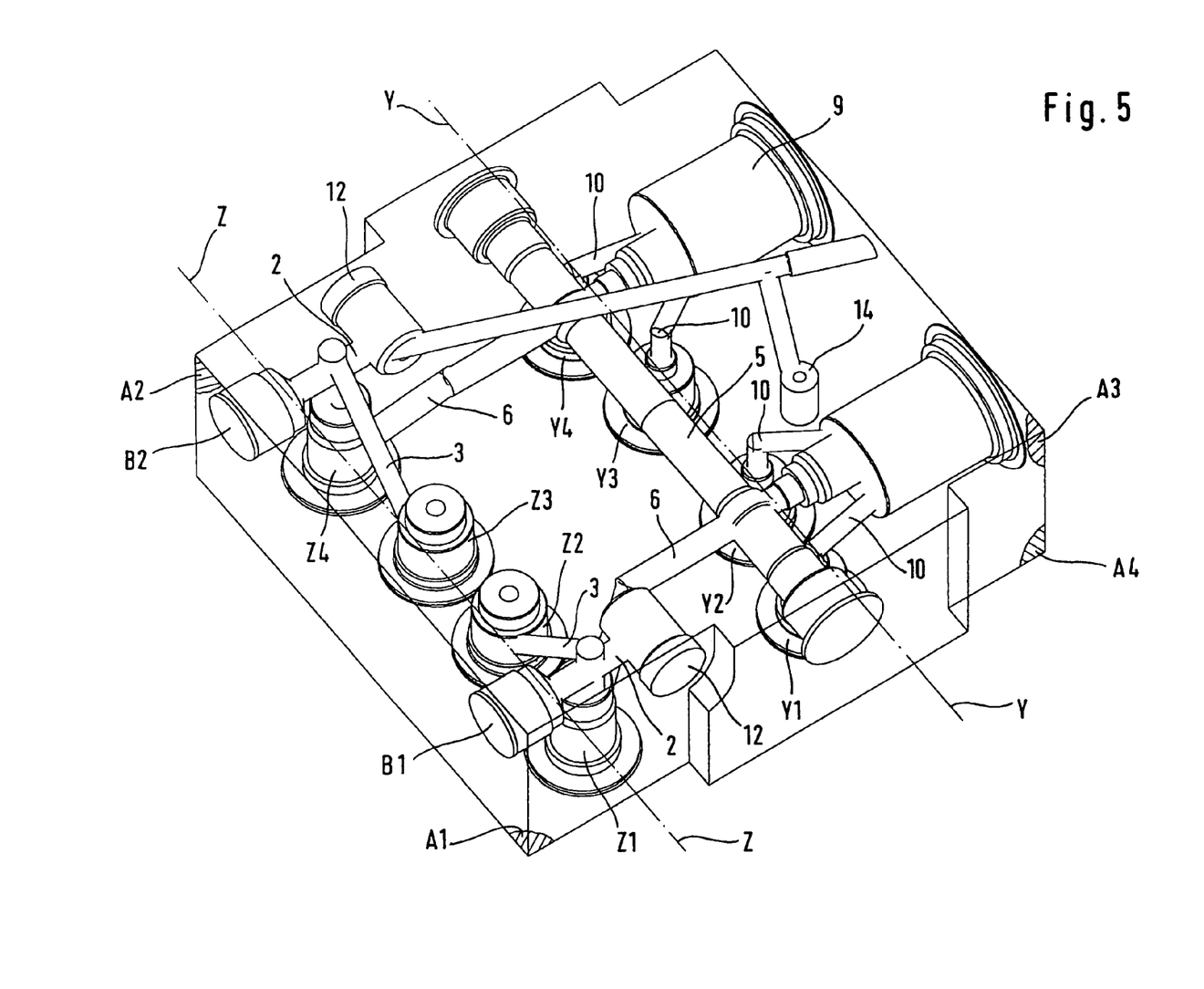
FIG. 5 is still another detail view of FIG. 1 with a braking pressure generator and separating valve connection modified with respect to FIG. 1 and disposed respectively at the valve-accommodating bore receiving the electric change-over valve.

Finally, the extremely compact arrangement of all channels and accommodating bores in the accommodating member 1 allows, if necessary, the integration of a blind-end bore for each brake circuit to accommodate a pump suction damper 12 apart from the valve-accommodating bore Z1 provided for the change-over valve, to what end the blind-end bore is connected by way of a suction damper channel 2 to the valve-accommodating bore Z1 accommodating the change-over valve (cf. FIGS. 1 and 5).

Due to the dual-circuit design of the brake circuit, two braking pressure generator ports B1, B2 and the two wheel brake ports R1, R3 open into the second housing surface A2 close to the outside edges of the block-shaped accommodating member 4, as becomes apparent from FIG. 1. As the brake system is meant for a multi-track motor vehicle being braked at four wheels, two further wheel brake ports R2, R4 are fitted to the top side of the accommodating member 1, for example. Depending on assembly or mounting conditions, the wheel brake ports R2, R4 may of course also be arranged in the second housing surface A2.

Thus, associated with the first brake circuit is the braking pressure generator port B1 which is normally connected to the wheel brake ports R1, R2 by way of the valve-accommodating bores Z1, Z2 in the third row of valves Z and the valve-accommodating bores X1, X2 in the first row of valves X. Hence, in the slip-free braking operation, there is an unimpeded connection through the valve-accommodating bore Z1, the transverse channel 3, the valve-accommodating bore Z2 and the inlet channel 4 to the open inlet valves in the two valve-accommodating bores X1, X2 of the first row of valves X which are connected directly to the wheel brake ports R1, R2 of the first brake circuit by way of the two wheel pressure channels 11 arranged side by side.

For brake slip control in a pressure reduction phase for the first brake circuit, there is a pressure fluid connection from the two valve-accommodating bores X1, X2 through a portion of the wheel pressure channel 11 to the opened outlet valves in the two valve-accommodating bores Y1, Y2 so that from there excessive braking pressure volume is conducted through the return channels 10 succeeding the bottoms of the valve-accommodating bores X1, X2 into the accumulator-accommodating bore 9 of the first brake circuit. For the purpose of renewed braking pressure increase, the pressure fluid of the wheel brakes of the first brake circuit stored in said accumulator-accommodating bore is supplied through the short portion of the suction channel 6 from a pump piston in the pump-accommodating bore 5 to the pressure channel 8, to the noise damping chamber 7 and again through the portion of the inlet channel 4 extending alongside the first row of valves X to the valve-accommodating bores X1, X2. If the outlet valves in the row of valves Y are closed again, the pressure fluid delivered by the pump propagates in the case of pressure increase in the wheel brakes through the opened inlet valves into the wheel pressure channels 11 and, thus, to the wheel brake ports R1, R2. If, however, it is desired to keep the wheel brake pressures in one of the wheel brakes constant, then both the inlet valve and outlet valve associated with the wheel brake remain in their closed position, with the result that the connection between the inlet channel 4 and the wheel pressure channel 11 in the first row of valves X and the connection of the wheel pressure channel 11 to the return channel 10 in the second row of valves Y are interrupted.

In the brake circuit that has already been described as an example, the separating valve inserted into the valve-accommodating bore Z2 of the third row of valves Z is electromagnetically closed and the change-over valve arranged in the valve-accommodating bore Z1 is opened for traction slip and driving dynamics control, so that pressure fluid propagates through the braking pressure generator port B1 opening laterally into the valve-accommodating bore Z1, to the first portion of the suction channel 6 arranged at the bottom of the valve-accommodating bore Z1, thus establishing a direct connection to the pump-accommodating bore 5 on the shortest way (bypassing the first and second row of valves X, Y). The pump piston inserted into the pump-accommodating bore 5 then supplies pressure fluid into the pressure channel 8 through the pump pressure valve inserted into the pump-accommodating bore 5 and from there through the already mentioned inlet channel 4 to the valve-accommodating bores X1, X2 which, depending on the prevailing pressure control cycle, are either opened or closed by the inlet valves in the direction of the wheel brake ports R1, R2.

It can be taken from the three-dimensional illustration of the hydraulic unit of the invention that a pressure fluid channel system is provided between the individual rows of valves X, Y, Z by means of straight and transverse bores, said system permitting an extension to traction slip and driving dynamics control in conformity with the demands of performance, while allowing a simplest possible realization in terms of manufacture.

Advantageously, the result of the selected position of the third row of valves Z for each brake circuit is an especially short, low-resistance suction channel 6 between the braking pressure generator port B1 or B2 and the associated pump-accommodating bore 5. Thus, the suction channel 6 is quick and ready to vent and fill. In addition, a piston pump in the pump-accommodating bore 5 is used to aspirate the pressure fluid quickly and reliably on the shortest way through the braking pressure generator port B1 or B2.

The statements made so far with respect to the first brake circuit apply accordingly with respect to the design and the function of the elements necessary for the second brake circuit, which are arranged mirror-symmetrically to the elements of the first brake circuit in the accommodating member 1.

To illustrate the previously described construction and function of the hydraulic unit, the arrangement of bores in the block will be described in the following by way of FIGS. 2 to 5 for the parts of the accommodating member 1 partly concealed in FIG. 1.

To this end, FIG. 2 shows a detail view of FIG. 1 for explaining the connections between the valve-accommodating bores Z2, Z3 arranged in the third and first row of valves Z, X and the pump-accommodating bore 5 through the inlet channel 4 for each brake circuit. Thereby, the pressure fluid supplied by the pump propagates either through the inlet valves switched open in the first row of valves X to the wheel pressure channels 11 and, hence, to the wheel brake ports R1, R2 (see FIG. 3) or retroacts in the closed position of the inlet valves to the separating valve in the valve-accommodating bore Z2 by way of the inlet channel 4 connecting the first row of valves X and the third row of valves Z. Thus, in the normally opened switch position of the separating valve, the pump pressure in the previously explained closing position of the inlet valve retroacts through the channel 3 that is laterally connected to the valve-accommodating bore Z3 into the valve-accommodating bore Z1 and to the braking pressure generator port B1 (see also FIG. 1).

It becomes apparent from FIG. 2 that the portion of the inlet channel 4 that extends transversely to the third and the first row of valves Z, X, in terms of manufacture, is made as a blind-end bore using the second housing surface A2 by means of a simple drilling operation upstream of the valve-accommodating bores Z2, X2. The actual connection of the channel portion extending transversely to the rows of valves X, Z is then constituted by respectively one drilling operation pointing from the first housing surface A1 to the valve-accommodating bores Z2, X2, said drilling operation penetrating the bottoms of the valve-accommodating bores Z2, X2 in the direction of the channel portion of the inlet channel 4 placed on top thereof and cutting the channel portion.

Likewise, the portion of the inlet channel 4 that extends horizontally above alongside the first row of valves X is provided from the fourth housing surface A4 by means of a drilling operation cutting the inlet channel 4. The connection between the outside valve-accommodating bore X1 and the horizontal portion of the inlet channel 4 is then constituted by a drilling operation directed from the first housing surface A1 vertically through the valve-accommodating bore X1, unless a direct intersection of the bottoms of the valve-accommodating bores X1, X2 is provided already during the horizontal drilling operation for making the inlet channel 4.

In the present example, the horizontal portion of the inlet channel 4 opens into a noise damping chamber 7 arranged in the area of the fourth housing surface A4 and connected to the pressure side of the pump-accommodating bore 5 by way of a pressure channel 8. Said pressure channel 8 is provided by means of a bore that is directed transversely from above into the accommodating member 1 and penetrates the outside end area of the pump-accommodating bore 5 until the intersection of the noise damping chamber 7. Both the noise damping chamber 7 and the transverse port of the pressure channel 8 are closed pressure-tightly to the outside by means of plugs.

FIG. 3 shows a cutout of the accommodating member 1 in the area of the portions of the wheel pressure channels 11 connecting the first and second row of valves X, Y to the wheel ports R1–R4 and the pressure sensor accommodating bores W1–W4. According to the illustration, the four wheel pressure channels 11 necessary for the wheel brakes point parallel side by side from the third housing surface A3 to the parallel arranged valve-accommodating bores X1–X4, Y1–Y4. The necessary drilling tool fully penetrates to this end the valve-accommodating bores of the second row of valves Y and cuts the walls of the valve-accommodating bores in the first valve-accommodating bore X. The link between the wheel brake ports R1–R4 and the valve-accommodating bores in the first row of valves X is established by way of the end portion of the wheel pressure channels 11 depending on the position of the wheel brake ports R1–R4. Depending on the position of the wheel brake ports R1–R4 chosen, a transverse or cross bore may be suitable to this end. The ends of the wheel pressure channels 11 are sealingly closed in the third housing surface A3, while the pressure sensor accommodating bores W1–W4 arranged parallel directly beside the second row of valves Y in a fourth track of punched holes W are closed by means of suitable sensors which exactly as the valves in the rows of valves normally project from the first housing surface A1.

Figure 4:
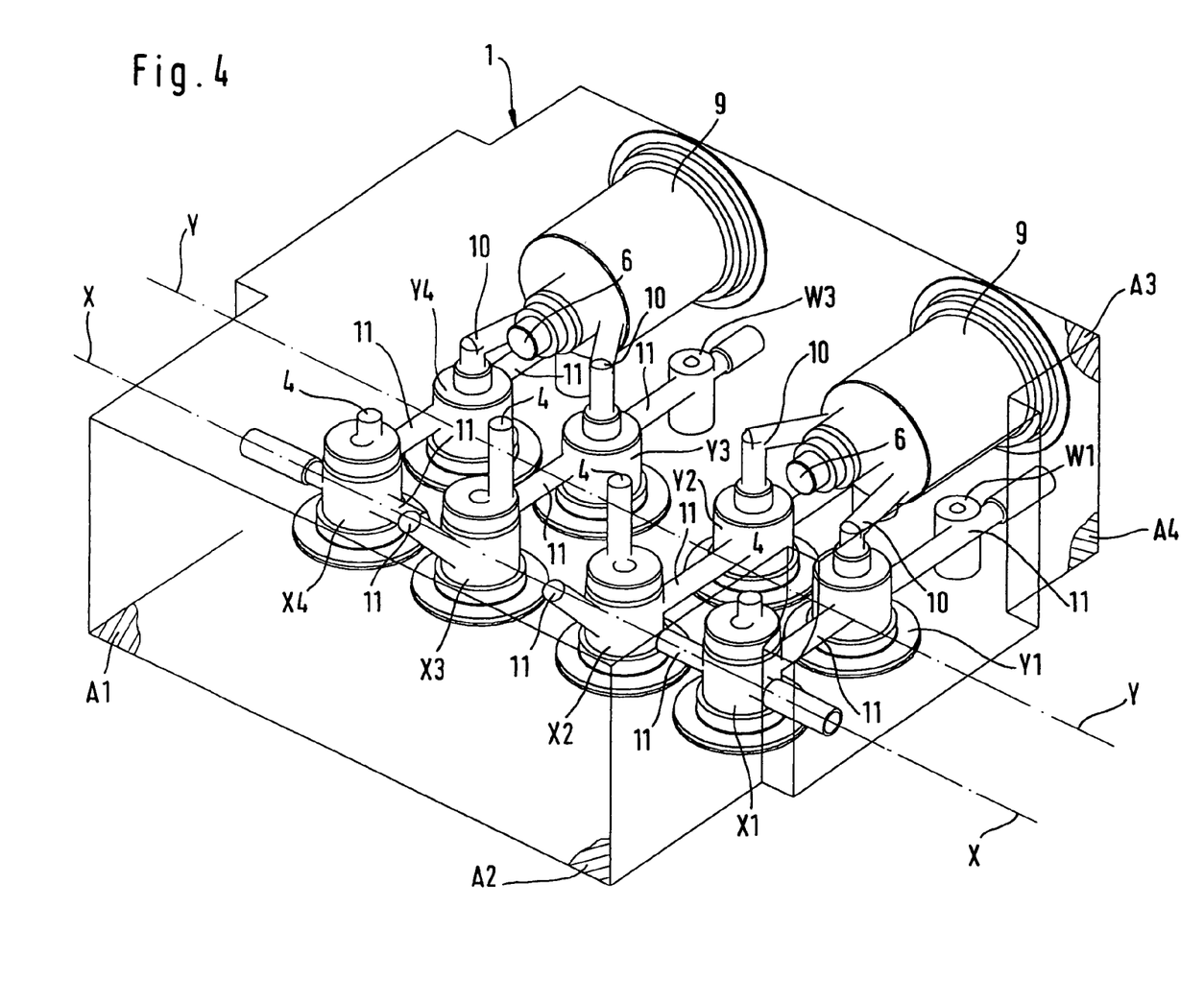
FIG. 4 is a detail view of FIG. 1 for explaining the pressure fluid return existing between the first and second row of valves and the accumulator-accommodating bores.

Following FIG. 3, FIG. 4 shows the connection of each valve-accommodating bore of the second row of valves Y through the return channels 10 to the accumulator-accommodating bores 9 disposed above the track of punched holes W. Each return channel 10 is continued as an angular channel produced by the conjunction of a horizontal and a vertical drilling operation, for what purpose one drilling operation is directed into the respective valve-accommodating bore of the second row of valves Y and into the bottom of the accumulator-accommodating bore. Further, all vertical ports of the inlet channels 4 at the bottoms of the four valve-accommodating bores X1–X4 in the first row of valves X and the wheel pressure channels 11 opening at the periphery of the valve-accommodating bores X1–X4 are apparent.

FIG. 5 finally shows another detail view of the subject matter of the invention with a braking pressure generator and separating valve connection, modified compared to FIG. 1, at the valve-accommodating bore Z1 receiving the electric change-over valve. The channel of the braking pressure generator port B1 or B2 now opens in an elevated position into the second housing surface A2 so that said is continued above the bottom of the valve-accommodating bore Z1 linearly to the accommodating bore of the pump suction damper 12. Consequently, the first portion of the suction channel 6 will now succeed below the bottom at the wall of the valve-accommodating bore Z1. The exchange of the channel ports now made compared to FIG. 1 allows reverse fluid flow through the valve-accommodating bore Z1 and, thus, also the change-over valve in case of need.

Further, the channel 3 in FIG. 5 is led as a transverse channel directly from the first housing surface A1 through the valve-accommodating bore Z2 to the point of connection of the braking pressure generator port B1 or B2 to the bottom of the valve-accommodating bore Z1. Further, another pressure sensor port 14 is arranged between the two accumulator-accommodating bores in FIG. 5, said port 14 being connected to the accommodating bore of the pump suction damper 12 by way of a pressure measuring channel traversing the pump-accommodating bore 5, with the result that the pressure prevailing at the braking pressure generator port B2 can be detected by means of an appropriate sensor system.

As far as further details illustrated in FIG. 5 are concerned, reference is made to the preceding explanations given with respect to FIGS. 1–4.

The invention claimed is:

1. Hydraulic unit for slip-controlled brake systems, comprising:
    an accommodating member having a first housing surface, a second housing surface angled relative to the first housing surface, and a third housing surface opposite to the second housing surface;
    a first row of inlet valve-accommodating bores that open into the first housing surface;
    a second row of outlet valve-accommodating bores that open into the first housing surface;
    at least one braking pressure generator port that opens into the second housing surface;
    at least one wheel brake port that opens into the second housing surface;
    a pump-accommodating bore arranged in the accommodating member and extending transversely to the inlet and outlet valve-accommodating bores, generally parallel to and between the first and second rows of valve-accommodating bores;
    a motor-accommodating bore arranged in the accommodating member and directed to the pump-accommodating bore;
    an accumulator-accommodating bore that opens into the third housing surface and extends transversely to the inlet and outlet valve-accommodating bores with the second row of valve-accommodating bores positioned between the accumulator-accommodating bore and the pump-accommodating bore;
    a third row of valve-accommodating bores arranged in the accommodating member between the first row of valve-accommodating bores and the second housing surface, the third row of valve-accommodating bores including an electric change-over valve-accommodating bore which is hydraulically linked to the pump-accommodating bore by way of a portion of a suction channel that traverses the first row of valve-accommodating bores; and
    a plurality of channels interconnecting the valve-, pump- and accumulator-accommodating bores and the at least one braking pressure generator port and the at least one wheel brake port to provide a hydraulic connection between the at least one braking pressure generator port and the at least one wheel brake port.

2. Hydraulic unit as claimed in claim 1,
    wherein the third row of valve-accommodating bores includes a separating valve-accommodating bore which is connected to the electric change-over valve-accommodating bore.

3. Hydraulic unit as claimed in claim 2,
    wherein the separating valve-accommodating bore is connected to the electric change-over valve-accommodating bore via a transverse channel.

4. Hydraulic unit as claimed in claim 1,
    wherein the pump-accommodating bore is penetrated by the suction channel in the direction of the accumulator-accommodating bore, with the suction channel opening into the bottom of the accumulator-accommodating bore.

5. Hydraulic unit as claimed in claim 4,
wherein the portion of the suction channel positioned between the pump-accommodating bore and the accumulator-accommodating bore is adapted to receive a non-return valve opening in the direction of the pump-accommodating bore.

6. Hydraulic unit as claimed in claim 1,
further comprising a pump suction damper blind-end extending into the accommodating member adjacent to the third row of valve-accommodating bores, said pump suction damper blind-end bore being connected by way of a pressure channel to the electric change-over valve-accommodating bore.

7. Hydraulic unit for slip-controlled brake systems, comprising:
an accommodating member having a first housing surface, a second housing surface angled relative to the first housing surface, and a third housing surface opposite to the second housing surface;
a first row of inlet valve-accommodating bores that open into the first housing surface;
a second row of outlet valve-accommodating bores that open into the first housing surface;
at least one braking pressure generator port that opens into the second housing surface;
at least one wheel brake port that opens into the second housing surface;
a pump-accommodating bore arranged in the accommodating member and extending transversely to the inlet and outlet valve-accommodating bores, generally parallel to and between the first and second rows of valve-accommodating bores;
a motor-accommodating bore arranged in the accommodating member and directed to the pump-accommodating bore;
an accumulator-accommodating bore that opens into the third housing surface and extends transversely to the inlet and outlet valve-accommodating bores with the second row of valve-accommodating bores positioned between the accumulator-accommodating bore and the pump-accommodating bore;
a third row of valve-accommodating bores arranged in the accommodating member between the first row of valve-accommodating bores and the second housing surface, the third row of valve-accommodating bores including an electric change-over valve-accommodating bore which is hydraulically linked to the pump-accommodating bore by way of a portion of a suction channel that traverses the first row of valve-accommodating bores and a separating valve-accommodating bore which is connected to the electric change-over valve-accommodating bore; and
a plurality of channels interconnecting the valve-, pump- and accumulator-accommodating bores and the at least one braking pressure generator port and the at least one wheel brake port to provide a hydraulic connection between the at least one braking pressure generator port and the at least one wheel brake port,
wherein the separating valve-accommodating bore is connected to an inlet channel that leads to the first row of valve-accommodating bores and opens into the bottom of one of the valve-accommodating bores of the first row which is designed as a blind-end bore.

8. Hydraulic unit as claimed in claim 7,
wherein the inlet channel extends along the first row of valve-accommodating bores to a noise damping chamber that opens adjacent to the pump-accommodating bore into a fourth housing surface into which the pump-accommodating bore extends.

9. Hydraulic unit as claimed in claim 8,
wherein a pressure channel extends radially through the pump-accommodating bore at an outside end of the pump-accommodating bore toward a blind-end bore of the noise damping chamber.

10. Hydraulic unit for slip-controlled brake systems, comprising:
an accommodating member having a first housing surface, a second housing surface angled relative to the first housing surface, and a third housing surface opposite to the second housing surface;
a first row of inlet valve-accommodating bores that open into the first housing surface;
a second row of outlet valve-accommodating bores that open into the first housing surface;
at least one braking pressure generator port that opens into the second housing surface;
at least one wheel brake port that opens into the second housing surface;
a pump-accommodating bore arranged in the accommodating member and extending transversely to the inlet and outlet valve-accommodating bores, generally parallel to and between the first and second rows of valve-accommodating bores;
a motor-accommodating bore arranged in the accommodating member and directed to the pump-accommodating bore;
an accumulator-accommodating bore that opens into the third housing surface and extends transversely to the inlet and outlet valve-accommodating bores with the second row of valve-accommodating bores positioned between the accumulator-accommodating bore and the pump-accommodating bore;
a third row of valve-accommodating bores arranged in the accommodating member between the first row of valve-accommodating bores and the second housing surface, the third row of valve-accommodating bores including an electric change-over valve-accommodating bore which is hydraulically linked to the pump-accommodating bore by way of a portion of a suction channel that traverses the first row of valve-accommodating bores; and
a plurality of channels interconnecting the valve-, pump- and accumulator-accommodating bores and the at least one braking pressure generator port and the at least one wheel brake port to provide a hydraulic connection between the at least one braking pressure generator port and the at least one wheel brake port,
wherein a return channel opens into the bottom of the accumulator-accommodating bore, said return channel being connected at least to one of the second row outlet valve-accommodating bores and arranged directly adjacent to the accumulator-accommodating bore.

11. Hydraulic unit as claimed in claim 10,
wherein each second row outlet valve-accommodating bore is configured as a blind-end bore, at the bottom of which a respective return channel connects to the accumulator-accommodating bore.

12. Hydraulic unit as claimed in claim 10,
wherein the wheel pressure channel extends past the pump-accommodating bore radially or tangentially through the second row outlet valve-accommodating bore to a respective first row inlet valve-accommodating bore and is connected to at least one wheel brake port by means of a wheel pressure channel extending past the third row of valve-accommodating bores.

13. Hydraulic unit as claimed in claim 12,
wherein a portion of the wheel pressure channel extends radially or tangentially through the second row outlet valve-accommodating bore, past the accumulator-accommodating bore to a pressure sensor accommodating bore in the third housing surface.

* * * * *